UNITED STATES PATENT OFFICE.

THOMAS ALFRED HAYNES, OF HOBOKEN, NEW JERSEY.

ARTIFICIAL GLUE OR SIZE.

SPECIFICATION forming part of Letters Patent No. 684,985, dated October 22, 1901.

Application filed July 17, 1900. Serial No. 23,973. (No specimens.)

*To all whom it may concern:*

Be it known that I, THOMAS ALFRED HAYNES, a subject of the Queen of England, residing at 501 Newark street, Hoboken, in the county of Hudson and State of New Jersey, have invented new and useful Improvements in Artificial Glue or Size, of which the following is a specification.

This invention relates to the manufacture of a new composition or glue which can be used for the sizing of paper and for many of the purposes for which glue or size is used.

My said composition, in brief, consists of a proportionate mixture of casein in a paste or liquid form and resin soap, the respective quantities and qualities of these elements being so proportioned and the preparation of the casein being of such a nature that the following novel characteristics are developed.

In the present state of the art of making paper a certain quantity of resin soap is used to size the paper, the said soap being precipitated and held in the paper by the addition of an amount of alum. It is recognized that the presence of a large amount of alum in paper-stock is harmful in that not only does it corrode the wires and other parts of the paper-machine, but that it injures the life and quality of the paper itself.

My experiments have been in the line of producing a material which would size paper as well as resin soap and which would require a smaller amount of alum to precipitate it. I have found that my new material, the manufacture of which I describe below, does size paper with about one-third the amount of alum which would be necessary to get the same results if resin soap were used. I find, further, that when resin soap is precipitated by alum and the precipitate so obtained is dried the result is a powdery mass, whereas when my new composition is likewise treated by alum and the precipitate dried the result is a horny mass. Experiments have proved to me that this difference in action of the precipitate is of immense value when my said composition is used as a size added to the paper-stock in the beating-engine, and in so becoming horny a contracting action is taking place which grips a certain amount of the fiber and filler, and thus the amount of waste fiber and filler carried off in the suction-water is very materially decreased, the saving on this point being in many instances sufficient to pay for the sizing of the paper. Further, I find that my said new composition improves the surface of the paper and toughens and increases the strength of same. It also acts as a mordant and decreases the amount of color usually required in the making of paper. I find also that my said new product is an excellent glue for many purposes and that it can also be used when properly diluted as tub-size and also for glazing and coating paper. The advantages of my new product are thus apparent.

In carrying out my invention I first produce casein or milk-glue in a pasty or liquid form in the following manner: I take any quantity of skimmed milk and heat it to about 170° Fahrenheit, and thus allow the lactic acid to generate, so that the milk in some hours becomes thick. I cut the liver-like mass into very small pieces by means of a cheese-knife, draw off the liquid, and press the solids as free from water as possible. In place of producing the solids by allowing the lactic acid to develop, as described, I sometimes produce the same by the employment of rennet or sulfuric or other acid; but when acid is used I am obliged to thoroughly wash the resultant solids to free them from all trace of acidity. This washing is, however, advisable in all cases. Having produced the solids, I place them in a wooden trough, the same as used by bakers, and knead into them a certain quantity of bicarbonate of soda and also a small quantity of borax or other alkali. The action of the bicarbonate of soda will cause the solids to rise. I then work them over again and allow them rest and repeat the operation until the mass has all become sticky and glutinous. This will be accomplished in about two hours. I then put the mass into a clean jacketed kettle fitted with agitators revolving slowly. I slowly apply heat until at about 170° Fahrenheit, when the mass will have have become liquid, but very frothy. I lower the heat now as quickly as possible to about 120° Fahrenheit, when most of the froth will have disappeared. I again raise the heat to about 170° Fahrenheit, and if the action of the soda is not then completed froth will again appear. If so, I lower the heat as before and again raise it. I continue this heating and cooling until the gas generated has worked off and the mass is a milky liquid.

While I prefer to make my casein as above described, still I find I can get satisfactory results by simply taking the solids from milk, as above described, and putting the same in a steam-jacketed kettle fitted with agitators and mixing therewith soda or other alkali or other solvent of casein, with or without the addition of water, and agitate the same until the whole mass becomes a clear milky liquid at a temperature of about 170° Fahrenheit, or the same results may be obtained without the use of heat if a sufficient amount of alkali or other solvent of casein is used. In another kettle I previously make a certain quantity of resin soap, preferably in proportion of one to three—that is to say, one part of resin soap to three parts of casein. This resin soap can be made by any known process; but I prefer to make it with the smallest possible amount of alkali. I now mix the contents of these two kettles, keeping them well stirred the while until they are thoroughly combined. I then bring the heat to about 140° Fahrenheit and add a certain amount of oil of sassafras or other suitable preservative. When this is done, the manufacture is complete and the compound can be drawn off into barrels, where it will set into a thick pasty mass, or it can be drawn off onto plates and dried hard and free from moisture. The quantities of soda and borax used vary; but I find ordinarily that I get good results by the use of one-half ounce of bicarbonate of soda and one-quarter ounce of borax to every eight pounds of skimmed milk operated upon. About six pounds of sassafras is used to every ton of finished product made.

While I have found that I obtained good results by the use of bicarbonate of soda and borax, I do not limit myself to their use, as in place of them, or either of them, I can use any alkali or other product that will resolve the casein into a sticky mass freely soluble in water.

Having now described my invention, I declare that what I claim is—

1. A new composition for use in the manufacture of paper, and generally as a substitute for glue, consisting of the mixture of casein and resin soap in suitable quantities.

2. The herein-described process for the production of a compound for use in the manufacture of paper, and generally as a substitute for glue and the like, comprising the following steps: precipitating casein from skimmed milk, in a manner substantially as described, adding an alkali thereto, kneading and working said composition and varying its temperature until all gas is worked off, and adding thereto a quota of resin soap.

In testimony whereof I have hereunto set my hand in the presence of two subscribing witnesses.

THOMAS ALFRED HAYNES.

Witnesses:
EDMUND W. WOKELEE,
ISAAC GANS.